US005447045A

United States Patent [19]

Cheng

[11] Patent Number: 5,447,045

[45] Date of Patent: Sep. 5, 1995

[54] APPARATUS FOR LOCKING A CLOSED NOTEBOOK COMPUTER ON A COMPUTER SUPPORT

[75] Inventor: Samuel Cheng, Hsin-Tien, Taiwan

[73] Assignee: Manufacturing Technology Resources Inc., Taiwan

[21] Appl. No.: 292,435

[22] Filed: Aug. 18, 1994

Related U.S. Application Data

[63] Continuation-in-part of Ser. No. 248,748, May 25, 1994.

[51] Int. Cl.⁶ ........................ E05B 73/00; F16B 41/00

[52] U.S. Cl. .......................................... 70/58; 70/232; 70/DIG. 57; 248/552

[58] Field of Search ........... 70/58, DIG. 57, 229–232, 70/159, 164; 248/551, 552; 361/685, 726, 683, 740, 759; 364/708.1

[56] References Cited

U.S. PATENT DOCUMENTS

| | | | |
|---|---|---|---|
| 4,065,946 | 1/1978 | Loynes et al. | 70/DIG. 57 X |
| 4,585,202 | 4/1986 | Parsekian | 248/553 |
| 4,751,831 | 6/1988 | Morris, Jr. et al. | 70/159 |
| 5,051,868 | 9/1991 | Leverault et al. | 364/708.1 X |

FOREIGN PATENT DOCUMENTS

| | | | |
|---|---|---|---|
| 2599203 | 11/1987 | France | 364/708.1 |

*Primary Examiner*—Lloyd A. Gall
*Attorney, Agent, or Firm*—Ladas & Parry

[57] ABSTRACT

An apparatus for locking a closed notebook computer on a computer support includes a lock support which has a counterbore and a shackle hole which are formed therethrough and which intersect each other. The computer has a computer housing and a display unit pivoted to the computer housing. An L-shaped locking plate has a horizontal portion located intermediately over the display unit, and a vertical portion with an aperture located between the lock support and the display unit. A bolt member extends through the counterbore of the lock support and the aperture of the L-shaped locking plate to engage threadably within the threaded hole of the computer. A padlock is fastened to the computer support and has a shackle extending through the shackle hole of the lock support so as to cover the recess portion of the bolt member, thereby preventing the bolt member from being accessed by a screwdriver.

1 Claim, 3 Drawing Sheets

APPARATUS FOR LOCKING A CLOSED NOTEBOOK COMPUTER ON A COMPUTER SUPPORT

CROSS-REFERENCE OF RELATED APPLICATION

This is a continuation in part of application Ser. No. 8/248,748 filed on May 25, 1994.

BACKGROUND OF THE INVENTION

1. Field of the Invention

This invention relates to an apparatus for locking a closed notebook computer on a computer support, in such a manner that the computer cannot be opened.

2. Description of the Related Art

Although the apparatus of application Ser. No. 248,748 can prevent the removal of a notebook computer from a computer support, a theft may easily steal the information in the computer due to the fact that the computer is openable.

SUMMARY OF THE INVENTION

The main object of this invention is to provide an apparatus for locking a closed notebook computer on a computer support, in such a manner that the apparatus can prevent the computer from being opened.

According to this invention, an apparatus for locking a closed notebook computer on a computer support includes a lock support which has a counterbore and a shackle hole which are formed therethrough and which intersect each other. The computer has a computer housing and a display unit pivoted to the computer housing. An L-shaped locking plate has a horizontal portion located intermediately over the display unit, and a vertical portion with an aperture located between the lock support and the display unit. A bolt member extends through the counterbore of the lock support and the aperture of the L-shaped locking plate to engage threadably within the threaded hole of the computer. A padlock is fastened to the computer support and has a shackle extending through the shackle hole of the lock support so as to cover the recess portion of the bolt member, thereby preventing the bolt member from being accessed by a screwdriver.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
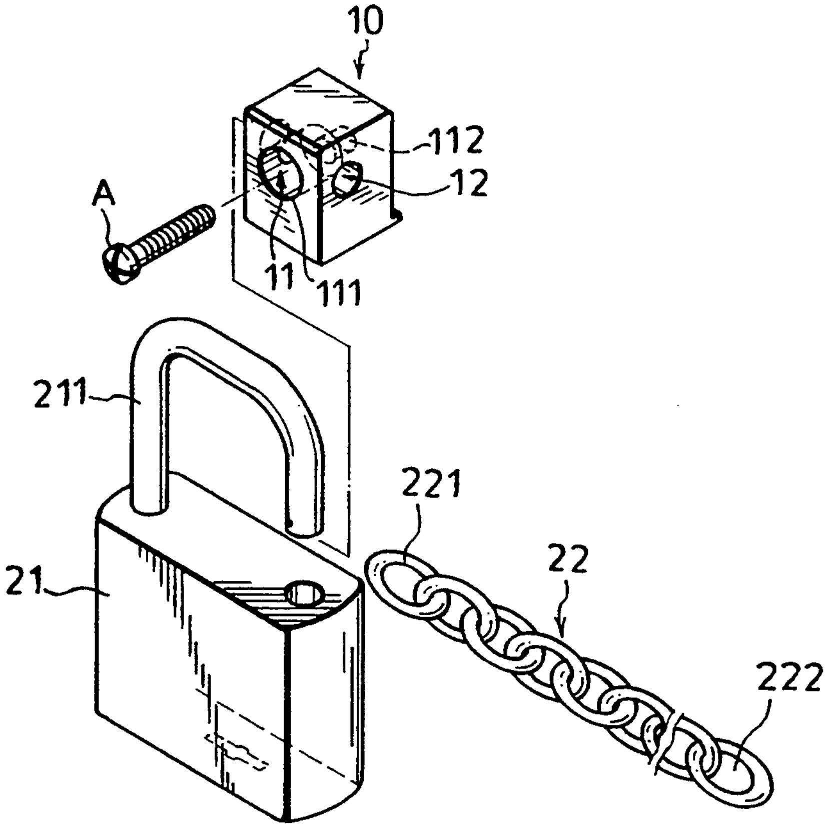
FIG. 1 is an exploded view showing a portion of an apparatus for locking a closed notebook computer on a computer support according to this invention.
Figure 2:
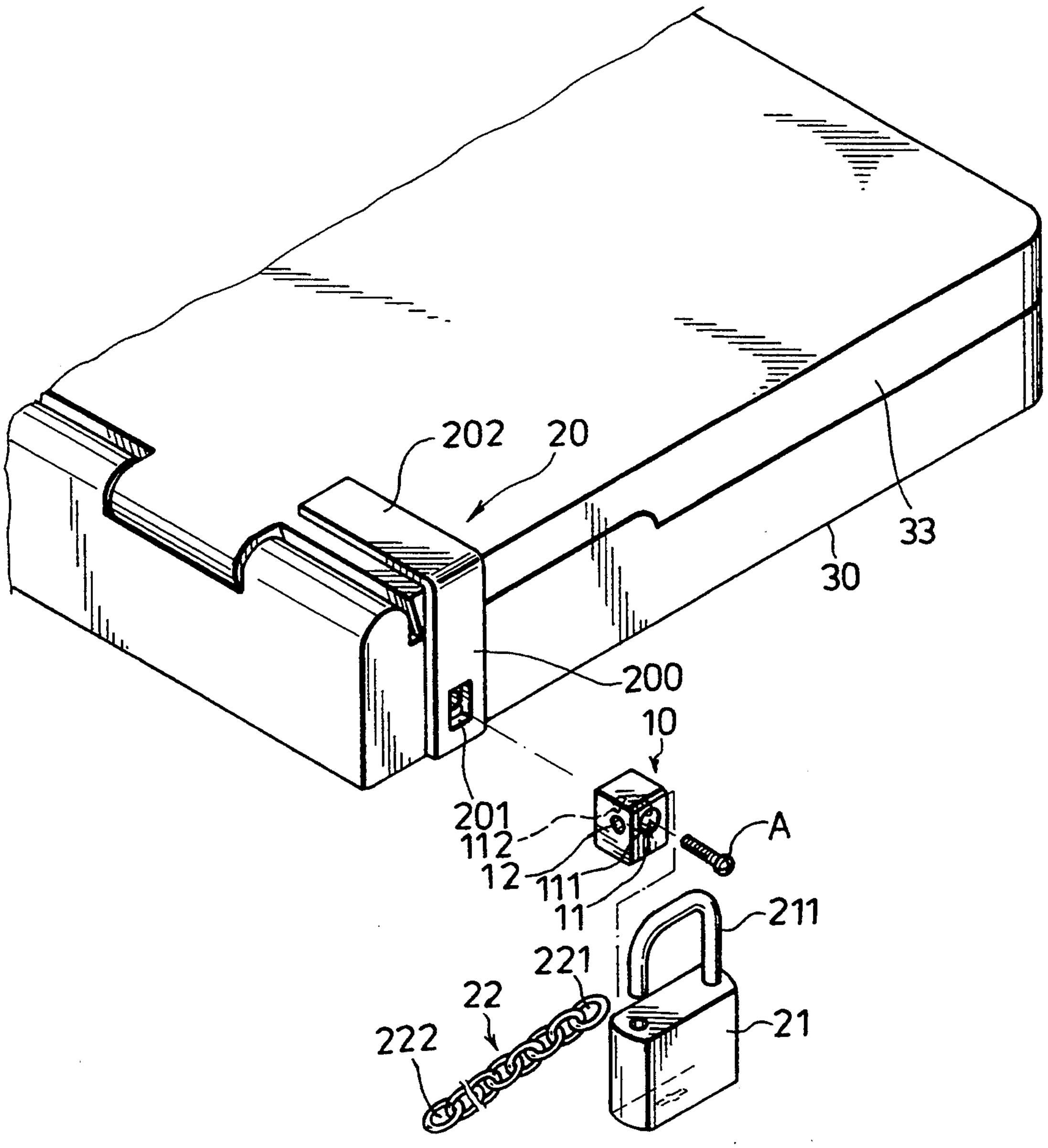
FIG. 2 is a partially exploded view showing the computer and the apparatus of this invention.
Figure 3:
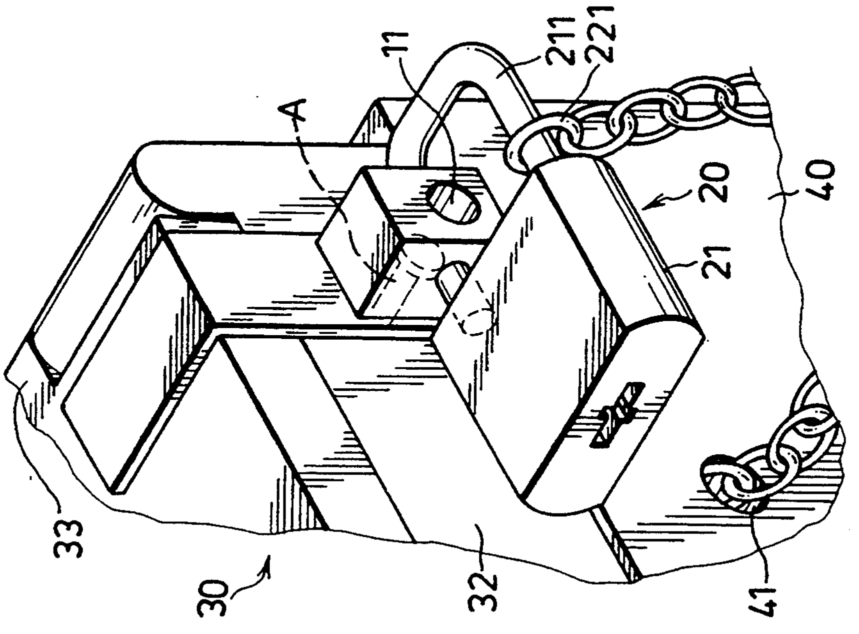
FIG. 3 is a perspective view illustrating the use of the apparatus of this invention.

Referring to FIGS. 1 and 2, an apparatus of this invention is used for locking a closed notebook computer 30 on a computer support or computer table 40 (see FIG. 3). The computer housing 32 of the computer 30 is of the type having a horizontally extending threaded hole 31 (see FIG. 4). A display unit 33 is pivoted to the computer housing 32. The apparatus includes a lock support 10, an L-shaped locking plate 20, and a padlock unit consisting of a padlock 21 and a flexible fixing member or metal chain 22. The lock support 10 and the padlock unit are similar to those of application Ser. No. 248, 748 in construction. The chain 22 has a first end ring 221 sleeved on the shackle 211, and a second end ring 222 confined in the computer table 40. As shown in FIG. 3, the hollow table 40 has a front wall through which a chain hole 41 is formed and through which the chain 22 extends.

Figure 4:
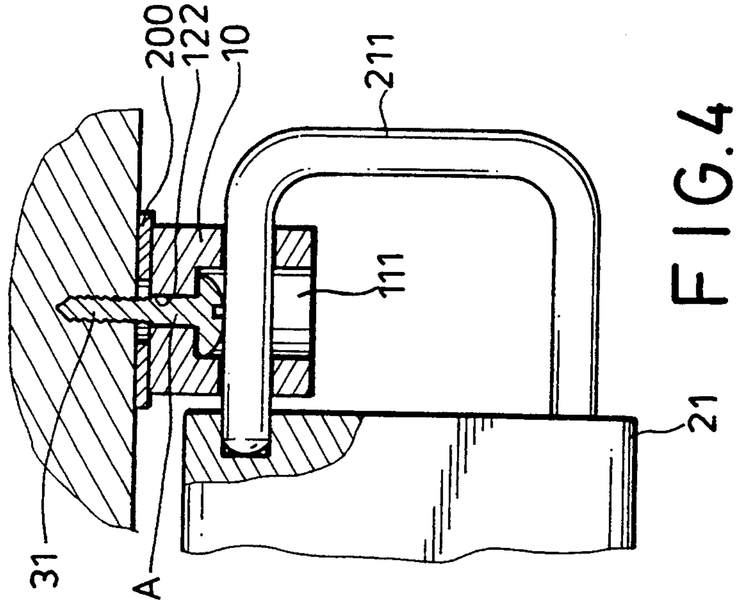
FIG. 4 is a partially sectional view illustrating the use of the apparatus of this invention.

As best shown in FIGS. 1 and 4, the lock support 10 has a horizontal counterbore 11 and a horizontal shackle hole 12 which are formed therethrough and which intersect each other. The counterbore 11 has a large-diameter portion 111 and a small-diameter portion 112. The threaded stem of the bolt member (A) extends through the small-diameter portion 112 of the lock support 10. As illustrated, the head of the bolt member (A) is located within the large-diameter portion 111 of the counterbore 11 of the lock support 10 and has a diameter greater than that of the small-diameter portion 112 of the counterbore 11 so as to fasten the lock support 10 to the computer housing 32.

The shackle 211 of the padlock 21 extends through the shackle hole 12 of the lock support 10 so as to cover the recess portion of the bolt member (A), thereby preventing a screwdriver from access to the bolt member (A) and preventing removal of the bolt member (A) from the lock support 10, which is screwed to the computer housing 32.

The apparatus of this invention is characterized in that the L-shaped locking plate 20 has a vertical portion 200 with an aperture 201, and a horizontal portion 202 which has an end integrally formed with the upper end of the vertical portion 200 and which is located intermediately over the display unit 33. The bolt member (A) extends through the counterbore 11 of the lock support 10 and the aperture 201 of the L-shaped locking plate 20 to engage within the threaded hole 31 of the computer housing 32.

When an associated key is inserted into the lock body of the padlock 21 and opens the same, the padlock 21 can be removed from the lock support 10 so as to permit a screwdriver to rotate the bolt member (A), thereby removing the lock support 10 from the computer housing 32. As a result, the L-shaped locking plate 20 can be removed from the computer so that the display unit 33 can rotate relative to the computer housing 32, thereby opening the computer.

With this invention thus explained, it is apparent that numerous modifications and variations can be made without departing from the scope and spirit of this invention. It is therefore intended that this invention is limited only as indicated in the appended claims.

I claim:

1. An apparatus for locking a closed notebook computer on a computer support, the computer having a computer housing which has a threaded hole formed in an outer surface of the computer housing, a display unit pivoted on the computer housing, and a bolt member engaged threadably within the threaded hole of the computer housing and having a head and a threaded stem, the head of the bolt member having a recess portion which can be rotated by a screwdriver, said apparatus including:

a lock support having a counterbore and a shackle hole which are formed therethrough and which intersect each other, said counterbore having a small-diameter portion and a large-diameter portion which has a diameter larger than that of said small-diameter portion, the threaded stem of the bolt member extending through said small-diameter portion of said counterbore of said lock support, the head of the bolt member being located within said large-diameter portion of said lock support and having a diameter greater than that of said small-diameter portion of said counterbore so as to fasten said lock support to the computer housing;

a padlock having a lock body and a shackle having two end portions which are locked within said lock body, said shackle extending through said shackle hole of said lock support and covering the recess portion of the bolt member so as to prevent the bolt member from being driven by the screwdriver; and an elongated flexible fixing member fastened to said padlock at one end portion thereof and to the computer support at the other end portion thereof;

wherein the improvement comprises:

an L-shaped locking plate having a horizontal portion located intermediately over said display unit, and a vertical portion which is secured to said horizontal portion at an upper end thereof and which has an aperture aligned with the threaded hole of the computer, said vertical portion of said locking plate being located between the threaded hole of the computer housing and the lock support so that the bolt member extends through said aperture of said locking plate, thereby preventing the display unit from rotating relative to the computer housing;

whereby, when said padlock is opened by an associated key, said padlock can be removed from said lock support so as to permit the screwdriver to access the recess portion of the bolt member, thereby removing said lock support from the computer housing, removal of the lock support from the computer housing permitting the display unit to rotate relative to the computer housing so as to open the computer.

* * * * *